> United States Patent Office 3,539,438
Patented Nov. 10, 1970

3,539,438
ELECTRICALLY INSULATIVE POLYMER IMPREGNATED, MICA-PAPER TAPE
Gaylord L. Groff, St. Paul, Minn., assignor to Minnesota Mining and Manufacturing Company, St. Paul, Minn., a corporation of Delaware
No Drawing. Filed June 12, 1967, Ser. No. 645,499
Int. Cl. B32b 5/16, 19/02
U.S. Cl. 161—163                 6 Claims

ABSTRACT OF THE DISCLOSURE

An electrically insulative soft, pliable mica-paper tape impregnated with a thermoset resin composition that includes (a) a copolymer of a monomer of acrylic acid ester of non-tertiary alcohol and a functional monomer based on acrylic acid and (b) a curing agent reactive with the functional groups of the functional monomer.

BACKGROUND OF THE INVENTION

The wrapping of objects such as coils in electric rotating machinery is a primary use for electrically insulative mica-paper tape impregnated with a thermoset resin composition. In this use, the tape must exhibit softness and pliability in addition to good tensile strength so that it can be wrapped in snug conformation around the object of application. Since unimpregnated mica paper does not itself exhibit this softness and pliability, this condition must be given the tape by the resin impregnated in it.

However, mica paper is difficult to impregnate due to its closely-packed, flaky structure. For example, 4-mil mica paper consisting 100 percent of mica platelets requires 80 seconds for impregnation in one standard test (ASTM D-202-65T) while dense, high-strength flexrope paper impregnated for use as electrically insulative tape requires only 2 seconds. As a result, most resin compositions that might provide the required softness and pliability when impregnated and cured in mica paper, as well as provide the other required mechanical and electrical properties, either cannot be impregnated in mica paper at all or only in amounts too low for satisfactory wrapping and electrically-insulative properties.

SUMMARY OF THE INVENTION

With this invention resin compositions have been found that are flexible in the cured state, but also readily saturate mica paper. When cured, these resin compositions give an electrically insulative wrapping tape exhibiting excellent softness and pliability. The tape of this invention, for example, is sufficiently flexible that it may be tightly wound on itself without splitting or being damaged. The new tape is conveniently wrapped around all varieties of coils to give a snug, conforming electrically insulative cover.

In general the new resin compositions include a copolymer, the monomeric constituents of which include (a) an acrylic acid ester of a non-tertiary alcohol, and (b) at least one functional monomer that is based on acrylic acid, is copolymerizable with the acrylic acid ester, and includes a reactive group. The functional monomer should comprise between about 1 and 25 mol percent of the copolymer, and the copolymer should have a number-average molecular weight less than about 20,000. A curing agent that has groups that are reactive with the reactive groups of the functional monomer is also included in the resin composition. In the completed tape the copolymer and curing agent have been reacted to crosslink the resin composition.

DETAILED DESCRIPTION

The acrylic acid esters useful in this invention are formed from a variety of different non-tertiary alcohols. The flexibility of the resin composition is best when the alcohol from which the ester is formed includes more than four carbons; but acrylates formed from alcohols having four carbons or less also give useful properties. Examples of the especially useful acrylates are isooctyl, 2-ethylhexyl, and fusel oil acrylate. Acrylates in which the alcohol includes more carbons than in these illustrative acrylates may also be used, but acrylates in which the alcohol includes more than 18 carbons are not readily available and, therefore, are not commercially practicable. It is preferred to use acrylates that include alkyl alcohol, but the use of such acrylates is not essential. Mixtures of different acrylates may be used, either prepared as a synthetic mixture or by esterifying acrylic acid with such a naturally occurring mixtur of alcohols as fusel oil. Minor amounts of methacrylic acid esters can also be included in the resin compositions of this invention in mixture with acrylic acid esters, but the inclusion of these esters results in somewhat more stiff tapes.

Reactive groups are introduced into the copolymer with functional monomers that are based on acrylic or methacrylic acid. These monomers include the structure of acrylic or methacrylic acid or the residue of that structure and are copolymerizable with the acrylic acid ester monomers described above. In addition, they bear a reactive group, typically a group that contains active hydrogens or is reactive with a group containing active hydrogens. The functional monomers are generally chosen from a group consisting of acrylic acid, methacrylic acid, itaconic acid, glycidyl acrylate, glycidyl methacrylate, acrylamide, methacrylamide, hydroxy ethyl acrylate or methacrylate, and hydroxy propyl acrylate or methacrylate. Of these, the most preferred are acid-functional monomers because they crosslink speedily and completely with a variety of curing agents.

So that the needed degree of cure is obtained, the functional monomer should comprise more than about 1 mol percent of the copolymer, and preferably more than 2 mol percent of the copolymer. On the other hand, flexibility in the tape is better when the mol percentage of functional monomer is restricted, and the functional monomer should comprise not much more than about 25 mol percent of the copolymer, and preferably less than about 10 mol percent.

The fastest and most complete impregnation of mica paper is obtained when the copolymer has a number-average molecular weight less than about 10,000. (The method used to determine number-average molecular weight for purposes of this specification is the vapor-pressure osmometry method outlined in the paper, "The Determination of Molecular Weight Using Thermistors," by J. J. Neumayer, published in Analytica Chemica Acta, vol. 20, No. 6, June 1959.) Fast impregnation is desirable since it permits rapid processing and lower costs of production. By lengthening the time that the mica paper is in the impregnating bath, tapes of useful flexibility can be obtained when the copolymer has a molecular weight up to about 20,000. The higher molecular-weight copolymers have the advantage that they give the tapes very good flexibility.

The copolymers of this invention are quite low in molecular weight in comparison to typical prior-art acrylate polymers. These low molecular weights are obtained by carefully controlling the polymerization procedure. The use of fairly large amounts of catalysts introduced at spaced intervals during the polymerization procedure, as well as the use of chain transfer agents, controls molecular weight satisfactorily. Where a low percentage of functional monomer is used, the molecular weight of the copolymer is desirably increased to assure good curing properties. A typical useful catalyst is azo-bis-isobutyronitrile while mercaptans such as tertiary dodecyl mercaptan are useful chain transfer agents.

The curing agent chosen for the resin composition of this invention will vary depending on the particular reactive group of the functional monomer. In addition, the amount of curing agent can be varied. Most often the curing agent is used in an amount that will theoretically balance the numbers of reactive groups in the copolymer and curing agent. However, cycloaliphatic epoxy resins are used with acid-functional copolymers in amounts much larger than these theoretical amounts; generally twice as much is used. It is believed that the epoxy groups of these resins in excess of those required to react with the carboxyl groups of the copolymer readily react with the hydroxyl group generated during the acid-epoxy reaction. Excess curing agent can also be used to provide a stiffer tape. An agent catalyzing homopolymerization of epoxy resin, for example, may be included in the latter case. Lower amounts of curing agent can also be used; for example, either cycloaliphatic or glycidyl ether epoxy resins are used in an amount sufficient to provide 0.75 epoxy groups for each carboxyl group of acid-functional copolymer. The low amounts are typically used with copolymers having a high percentage of functional monomer.

For resin compositions in which acrylic acid is the functional monomer, epoxy resins have been found to be quite desirable curing agents and to give the best electrical properties. Cycloaliphatic epoxy resins are more desired than other types since they react faster with acid groups and therefore reduce process times. Other useful agents, when the reactive group is a carboxylic acid group include aziridines and amines. For resin compositions in which the reactive group is an amide group, compounds having methylol groups are useful curing agents. For resin compositions in which the reactive group is an epoxy group, the useful curing agents include anhydrides, organic polybasic acids, and amines. For resin compositions in which the functional group is a hydroxy group, diisocyanates are useful curing agents.

The most advantage from the good insulating properties of mica is obtained with mica paper that consists 100 percent of mica platelets. On the other hand, more porous mica papers, such as made by the incorporation of fibers in addition to mica, also provide quite useful insulating properties, and these papers are more easily impregnated. For example, a good tape of this invention is prepared from mica paper consisting 70 percent of mica platelets, with the balance being fibers introduced in nonwoven arrangement. Generally, mica-paper tapes are made from mica paper that is less than 10 mils in thickness, though thicker paper can also be used depending on the need; and the resin compositions of this invention also provide good flexibility to sheets that are thicker than 10 mils.

The new tapes are further illustrated in the following examples:

EXAMPLE 1

A copolymer including 96.43 mol percent isooctyl acrylate and 3.57 mol percent acrylic acid was prepared. First, 1,997.5 pounds of isooctyl acrylate, 29.0 pounds of acrylic acid, and 17.9 pounds of tertiary dodecyl mercaptan were mixed in a stainless steel weigh tank. A charge of 2,787.5 pounds of toluene was then placed in a 1500 gallon glass-lined kettle, after which 147 pounds of the mixture in the weigh tank was added. While the resulting mixture was agitated at high speed by a stirrer, the gaseous contents in the kettle were partially evacuated three separate times, and each time replaced by introducing nitrogen from the bottom of the kettle.

A slight nitrogen flow was continued through the bottom of the kettle while the batch was heated to 175° F. and agitated at high speed. Next, three separate 22-pound charges of azo-bis-isobutyronitrile dissolved in toluene (supplied under the trade name Vazo by Du Pont) were added at equal intervals over a period of approximately 50 minutes; each charge consisted of 7 pounds of Vazo and 15 pounds of toluene. During this period the mixture from the weigh tank was also added continuously at a rate of about 37 pounds per minute. After another 50-minute period, a charge of 5 pounds of Vazo dissolved in 15 pounds of toluene was added, and the temperature of the contents was then held at 175° F. for 2½ additional hours. A sample of this copolymer solution taken at this point was found to exhibit a viscosity at 25° C. (77° F.) of 17 centipoises and had an acid number of 4.4. The solids content of a sample dried for 15 minutes at 300° F. was about 40 weight percent (all percents are in weight-percent unless otherwise specified).

The resin composition was then completed by adding to this copolymer solution 124.1 pounds of 3,4-epoxycyclohexylmethyl - 3,4-epoxycyclohexanecarboxylate having an average molecular weight of about 260 and a viscosity of about 500 centipoises at 24° C. (Union Carbide ERL–4221); after thorough mixing, the batch was drained.

A tape having three layers—mica paper, glass cloth, and polyethylene terephthalate film—was then prepared using this resin composition. A woven glass cloth having a thickness of 1.7 mils (Style 1070) was first dipped in a solution of the resin composition which had been catalyzed with uranyl nitrate hexahydrate; 0.193 gram of the latter compound had been added per pound of resin solution. Mica paper having a thickness of 2 mils and consisting 100 percent of reconstituted muscovite mica platelets (Samica ES–20) was then laid on the resin-saturated glass cloth, and this assembly was dried and cured for about two minutes in an oven at 435° F. Next, the assembly was coated lightly on the mica-paper side with the catalyzed resin composition, and the assembly was again dried and cured for about two minutes in an oven at 435° F. After this step, the mica-paper side of the assembly was tacky, and ¼-mil polyethylene terephthalate film was laminated to this side by passing the assembly and the film through laminating rolls.

The thickness of the resulting tape was about 5.65 mils, and the tape was very flexible, soft and pliable. The resin content of the tape was 31.7 percent. The resin in the tape was well crosslinked, as shown by the fact that the tape softened but remained intact when soaked in acetone and toluene and, when dried, was again usable. Strips of the tape ¾ inch wide were easily wrapped with good conformation on an electrical coil whose cross section was a ½-inch by ¾-inch rectangle in which the corners had a radius of approximately ⅟₁₆ inch. The initial Gurley stiffness of the tape was 505 milligrams and, after one week's accelerated aging at 180° C. (356° F.), was 1,363 milligrams. The initial total dielectric strength of the tape at room temperature was 5,480 volts, and after accelerated aging for one week at 180° C. (356° F.), was 4,920 volts.

Dielectric properties of the tape were:

| | 23° C. (73° F.) | 90° C. (194° F.) | 130° C. (266° F.) | 155° C. (311° F.) |
|---|---|---|---|---|
| Dissipation factor (100 cycles/second) | .036 | .049 | .127 | .177 |
| Dielectric constant (100 cycles/second) | 2.63 | 2.42 | 2.51 | 2.54 |
| Volume resistivity (ohm-cm.) (500 volts DC) | $1.9 \times 10^{14}$ | $1.1 \times 10^{14}$ | $2.3 \times 10^{13}$ | $5.3 \times 10^{13}$ |

EXAMPLE 2

A copolymer of 2-ethylhexylacrylate and methacrylic acid that included 3.57 mol percent methacrylic acid was first prepared. A monomer solution of the following ingredients was mixed:

|  | Grams |
|---|---|
| 2-ethylhexyl acrylate | 559.6 |
| Methacrylic acid | 9.7 |
| Toluene | 114.5 |
| Azo-bis-isobutyronitrile (Vazo) | 4.8 |

The polymerization was conducted in a 2-liter, 3-neck flask equipped with a stirrer, nitrogen inlet and outlet, thermometer, pressure-equalized dropping funnel, and reflux condenser. A charge of 681.7 grams of toluene was first placed in the flask and the system was then swept with nitrogen. The toluene was then heated to 176° F. by a steam-heated water bath. While the mixture was constantly stirred, three grams of Vazo were added to the flask and the monomer solution was added at a uniform rate over a 45-minute period. One hour after the last addition of monomer solution, 3 grams of Vazo were added and ½ hour later 2 grams more of Vazo were added. The reaction was then continued for another 2½ hours. Throughout the reaction the temperature was controlled at 170° F.±2° F.

The resulting solution had a solids content of about 40 percent and a viscosity of 24.5 centipoises at 24° C. The acid number of the solution was 3.4, and the number-average molecular weight of the copolymer was determined as 8,400. The time to completely wet and penetrate 80-second 4-mil mica paper consisting 100 percent of reconstituted muscovite platelets (Samica ES–40) was about six minutes.

The resin composition was completed by adding to 127 parts of the above 40 percent solids copolymer solution, 3.2 parts of epoxy resin (ERL–4221), and 1.08 parts of a 10 percent solids solution of uranyl nitrate hexahydrate in methyl ethyl ketone. When a thin film of the resin composition solution was heated on a hot plate to 400° F., the composition gelled in 35 seconds after removal of solvent. After two minutes it had cured to a tacky, very rubbery state.

A mica-paper tape reinforced with glass cloth was made by first laying 2-mil glass cloth (Style 108) over 2-mil mica paper (Samica ES–20). The resin composition was liberally applied over the glass cloth by means of a paint brush, allowed to soak into the mica paper for about two minutes, and again painted on the glass cloth so that the top was wet well. This assembly was dried in an oven at 200° F. for 10 minutes and then cured at 400° F. for 5 minutes. After this heat treatment the resin had cured to a soft, pliable state; the tape exhibited an initial Gurley stiffness of 737 milligrams and, after accelerated aging for one week at 356° F., had a Gurley stiffness of 1,496 milligrams. The glass cloth and mica paper were well saturated with resin and bonded together well, the tape having a resin content of 33.6 percent. The total dielectric strength of the tape was 5,160 volts initially and, after accelerated aging for one week at 356° F., was 5,440 volts. The dielectric constant (100 cycles/second) (155° C., 311° F.) was 3.17 while the dissipation factor under the same conditions was 0.233.

EXAMPLE 3

A copolymer of isooctyl acrylate and acrylic acid that included 7.14 mol percent acrylic acid, was prepared, with the first step being the mixing of a monomer solution having the following ingredients:

|  | Grams |
|---|---|
| Isooctyl acrylate | 562.4 |
| Acrylic acid | 17.0 |
| Tertiary dodecyl mercaptan | 10.0 |
| Toluene | 98.8 |
| Vazo | 3.6 |

The polymerization apparatus and procedure were the same as that outlined in Example 2. However, 685.4 grams of toluene were charged to the flask initially; 2.25 grams of Vazo were added to the toluene before adding the monomer solution; the first post-addition of Vazo was 2.25 grams; and the second post-addition of Vazo was 1.50 grams. This polymerization procedure gave an approximately 40 percent solids solution of the copolymer. The solution had a viscosity of 16.3 centipoises, and its acid number was 8.4. The viscosity of the copolymer after solvent removal was 180,000 centipoises at 24° C. (75° F.), and the number-average molecular weight of the copolymer was found to be 4,600. Three minutes were required for the 40 percent solution to penetrate 80-second, 4-mil mica paper.

The 40 percent solids solution of the copolymer was compounded with curing agent and catalyst as follows:

|  | Parts by weight |
|---|---|
| 40 percent solids solution of copolymer | 62.5 |
| Epoxy resin (ERL–4221) | 3.2 |
| Uranyl nitrate hexahydrate (10 percent solids solution in methyl ethyl ketone) | 0.56 |

When a thin film of resin composition solution was heated on a hot plate to 400° F., the composition gelled in 13 seconds after removal of solvent; and the composition was well cured to a tacky, rubbery state in about one minute.

A mica-paper tape reinforced with glass cloth was made in the manner outlined in Example 2. The resin content of the tape was 35.3 percent and the glass cloth and the mica paper were well bonded together. The tape was somewhat less flexible than the tapes of Examples 1 and 2, having an initial Gurley stiffness of 1,132 milligrams and a Gurley stiffness after accelerated aging for one week at 356° F. of 1,567 milligrams. The dielectric strength of the tape was initially 3,860 volts while, after accelerated aging for one week at 356° F., it was 4,260 volts. The dielectric constant and dissipation factor (both measured at 100 cycles/second, 155° C., 311° F.) were 2.81 and 0.173, respectively.

EXAMPLE 4

A copolymer of 96.43 mol percent n-butyl acrylate and 3.57 mol percent acrylic acid was prepared, with the first step being the mixing of a monomer solution of the following ingredients:

|  | Grams |
|---|---|
| n-Butyl acrylate | 568.5 |
| Acrylic acid | 11.8 |
| Tertiary dodecyl mercaptan | 7.2 |
| Toluene | 100.8 |
| Vazo | 3.6 |

The apparatus and procedure for the polymerization reaction were the same as that used in Example 3. An approximately 40 percent solids solution of the copolymer resulted from this procedure. The viscosity of the solution was 31.4 centipoises and the acid number of the solution was 5.6. The viscosity of the copolymer with the solvent removed was 336,000 centipoises at 24° C. (75° F.), and the number average molecular weight of the copolymer was determined to be 4,750. Eleven minutes were required to penetrate 80-second, 4-mil mica paper.

The copolymer was mixed with a curing agent and catalyst in the following proportions:

|  | Parts by weight |
|---|---|
| 40 percent solids solution of copolymer | 90 |
| Epoxy resin (ERL–4221) | 3.2 |
| Uranyl nitrate hexahydrate (as a 10 percent solids solution in methyl ethyl ketone) | 0.78 |

When a thin film of the resin composition solution was heated on a hot plate to 400° F., the composition gelled in 7½ seconds after removal of solvent; the composition was well cured after about one minute to a very rubbery tacky material. A well-bonded mica paper-glass cloth tape as described in Example 2 was prepared having a resin content of 35.2 percent. The tape was quite pliable as indicated by its exhibition of an initial Gurley stiffness of 986 milligrams and a Gurley stiffness after aging for one week at 356° F. of 1,110 milligrams. The initial dielectric strength of the tape was 3,760 volts and after aging for one week at 356° F. it was 3,780 volts.

EXAMPLE 5

A copolymer of isooctyl acrylate and acrylic acid, that included 1.32 mol percent of acrylic acid, was prepared by first mixing a monomer solution of the following ingredients:

|  | Grams |
|---|---|
| Isooctyl acrylate | 576.6 |
| Acrylic acid | 3.0 |
| Toluene | 101.0 |
| Vazo | 2.4 |

The polymerization procedure and apparatus was that out-lined in Example 2. However, the initial charges of toluene and Vazo were 685 grams and 1.5 grams, respectively; the first post-addition of Vazo was 1.5 grams; and the second post-addition of Vazo was 1.0 gram.

This procedure prepared a 40 percent solids solution of the copolymer. The viscosity of this solution was 31.6 centipoises, and the acid number of the solution was 1.4. The viscosity of this solution after solvent-removal was 425,000 centipoises at 24° C., and the number-average molecular weight of the copolymer was 13,000. Six minutes were required for the 40 percent solution to penetrate 80-second 4-mil mica paper.

The complete resin composition was prepared by mixing the solution of the copolymer with the curing agent and catalyst as follows:

|  | Parts by weight |
|---|---|
| 40 percent solution of copolymer | 86.8 |
| Epoxy resin (ERL–4221) | 0.8 |
| Uranyl nitrate hexahydrate (10 percent solution in methyl ethyl ketone) | 0.7 |

A mica paper-glass cloth tape having a resin content of 35.9 percent was made from this resin composition by the procedure of Example 2. The resin was extremely soft and pliable; it had an initial Gurley stiffness of 637 milligrams and after aging for one week at 356° F. the Gurley stiffness was 1156 milligrams. The initial dielectric strength of the tape was 3800 volts and after aging at 356° F. for one week was 4980 volts. The dielectric strength and dissipation factor (at 100 cycles/second and 155° C.) were 3.73 and 0.367, respectively.

EXAMPLE 6

A copolymer of isooctyl acrylate and acrylic acid, that included 16.67 mol percent acrylic acid was prepared, with the first step being the mixing of a monomer solution with the following ingredients:

|  | Grams |
|---|---|
| Isooctyl acrylate | 538.0 |
| Acrylic acid | 42.1 |
| Tertiary dodecyl mercaptan | 22.8 |
| Toluene | 99.5 |
| Vazo | 3.6 |

The apparatus and procedure for the polymerization reaction were the same as that outlined in Example 3. The product of the reaction was a 40 percent solution of the copolymer. The viscosity of the solution was 23 centipoises while the viscosity of the copolymer with solvent removed was 730,000 centipoises at 24° C. (75° F.). Two and one-half minutes were required for the 40 percent solution to impregnate 80-second 4-mil mica paper. The acid number of the solution was 19.8, and the number-average molecular weight of the copolymer was 3,300.

The complete resin composition was prepared by mixing the solution of the copolymer with the curing agent and catalyst as follows:

|  | Parts by weight |
|---|---|
| 40 percent solids solution of the copolymer | 49.6 |
| Epoxy resin (ERL–4221) | 6.4 |
| Uranyl nitrate hexahydrate (10 percent solids solution in methyl ethyl ketone) | 0.52 |

When a thin film of the resin composition solution was heated on a hot plate to 400° F., the composition gelled in 5 seconds after solvent removal; the composition was well cured to a rubbery non-tacky state in about 30 seconds.

A mica paper-glass cloth tape was made in the manner described in Example 2. This tape had a resin content of 30 weight-percent, and the glass cloth and mica paper well bonded to one another. The tape was flexible and conformable, and was readily wrapped on a coil in which the cross-section was a ½ inch by ¾ inch rectangle having a radius at the corners of about $\frac{1}{16}$ inch. The Gurley stiffness of the tape was initially 1,318 milligrams and after storage of the tape for one week at 180° C. was 1,460 milligrams. The initial dielectric strength of the tape was 4,780 volts and after aging of the tape for one week at 180° C. was 3,680 volts. The dielectric constant and dissipation factor (both measured at 100 cycles/second, 155° C.) were 2.77 and 0.101, respectively.

EXAMPLE 7

A copolymer of 2-ethylhexyl acrylate and acrylic acid copolymer that included 3.57 mol percent acrylic acid was prepared, with the first step being the preparation of a monomer solution with the following ingredients:

|  | Grams |
|---|---|
| 2-ethylhexyl acrylate | 324.65 |
| Acrylic acid | 4.75 |
| Vazo | 0.50 |

The copolymer was prepared in a 1-liter flask using essentially the same conditions as outlined in Example 2 except that 432.1 grams of toluene plus 1.50 grams of Vazo were initially charged to the flask, and three 0.2 gram charges of Vazo were added to the flask at 20-minute intervals.

The product of the polymerization reaction was an approximately 40 percent solids solution of the copolymer. The viscosity of the copolymer with solvent removed was 410,000 centipoises at 24° C. (75° F.). The acid number of the 100 percent solids copolymer was 9.8 and the number-average molecular weight of the copolymer was 8,000.

The resin composition was completed by the addition of tris-(1-aziridinyl) phosphine oxide as curing agent. An 80 percent solids solution of this curing agent in ethanol was added to the copolymer solution in a ratio of 0.9 part of the aziridine solution to 126 parts of the copolymer solution. This composition gelled in about 8 minutes on a hot plate heated to 300° F. and after 10 minutes had cured to a weak rubbery tacky mass.

Mica paper-glass cloth tape prepared in the manner described in Example 2 was well bonded and quite flexible. The dissipation factor (100 cycles per second, 155° C.) was 0.315 and the volume resistivity (500 volts D.C. 155° C.) was $3 \times 10^{10}$ ohm-centimeters.

I claim:
1. An electrically insulative soft, pliable mica-paper tape impregnated with a thermoset resin composition and wrappable in snug conformation around an object to be insulated, said tape comprising a mico-paper sheet saturated with a resin composition that includes (1) a copolymer having a number-average molecular weight of less than about 20,000, the monomer constituents of which include (a) an acrylic acid ester of non-tertiary alcohol, and (b) at least one functional monomer that is based on acrylic or methacrylic acid, is copolymerizable with the acrylic acid ester, and includes a reactive group that contains active hydrogens or is reactive with a group that contains active hydrogens; the functional monomer comprising between about 1 and 25 mol percent of the copolymer; and (2) a curing agent reacted with the reactive group of the functional monomer whereby the resin composition is crosslinked.

2. The tape of claim 1 in which the functional monomer is selected from the group consisting of acrylic acid, methacrylic acid, itaconic acid, acrylamide, methacrylamide, glycidyl acrylate, glycidyl methacrylate, hydroxy ethyl acrylate and methacrylate and hydroxy propyl acrylate and methacrylate.

3. A tape of claim 1 that further includes a reinforcing fibrous sheet laminated to at least one side of the tape.

4. A tape of claim 1 that further includes a preformed polymeric electrically insulative film laminated to at least one side of the tape.

5. An electrically insulative soft, pliable mica-paper tape impregnated with a thermoset resin composition and wrappable in snug conformation around an object to be insulated, said tape comprising a mica-paper sheet saturated with a resin composition that includes (1) a copolymer having a number-average molecular weight of less than about 10,000, the monomeric constituents of which include (a) an acrylic acid ester of non-tertiary alcohol, and (b) at least one functional monomer selected from the group consisting of acrylic acid and methacrylic acid; the functional monomer comprising between about 2 and 10 mol percent of the copolymer; and (2) a curing agent reacted with the functional group of the functional monomer whereby the resin composition is crosslinked.

6. The tape of claim 5 in which the curing agent is an epoxy resin.

References Cited
UNITED STATES PATENTS

| | | | |
|---|---|---|---|
| 2,562,004 | 7/1951 | Watson et al. | 161—163 |
| 2,739,638 | 3/1956 | Lewis et al. | 161—163 XR |
| 2,763,315 | 9/1956 | Berberich et al. | 161—163 |
| 2,925,174 | 2/1960 | Stow | 117—138.8 XR |
| 2,954,358 | 9/1960 | Hurwitz | 117—161 XR |
| 3,301,801 | 1/1967 | Gaske et al. | 260—837 XR |

DOUGLAS J. DRUMMOND, Primary Examiner

G. W. MOXON II, Assistant Examiner

U.S. Cl. X.R.

161—171